United States Patent
Hirano et al.

(10) Patent No.: US 8,964,694 B2
(45) Date of Patent: Feb. 24, 2015

(54) COMMUNICATION SYSTEM, COMMUNICATION PROCESSING DEVICE AND AUTHENTICATION PROCESSING DEVICE

(75) Inventors: Jun Hirano, Kanagawa (JP); Takashi Aramaki, Osaka (JP); Shinkichi Ikeda, Kanagawa (JP); Takahisa Aoyama, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 484 days.

(21) Appl. No.: 13/001,009

(22) PCT Filed: Jun. 22, 2009

(86) PCT No.: PCT/JP2009/002833
§ 371 (c)(1),
(2), (4) Date: Dec. 22, 2010

(87) PCT Pub. No.: WO2009/157172
PCT Pub. Date: Dec. 30, 2009

(65) Prior Publication Data
US 2011/0110334 A1    May 12, 2011

(30) Foreign Application Priority Data

Jun. 27, 2008 (JP) ................................ 2008-168773
Jan. 30, 2009 (JP) ................................ 2009-019217

(51) Int. Cl.
*H04W 4/00* (2009.01)
*H04W 12/06* (2009.01)
*H04W 36/00* (2009.01)

(52) U.S. Cl.
CPC .......... *H04W 12/06* (2013.01); *H04W 36/0016* (2013.01)
USPC ............................ 370/331; 455/436; 713/168

(58) Field of Classification Search
None
See application file for complete search history.

(56) References Cited

U.S. PATENT DOCUMENTS 7,356,567 B2 *   4/2008   Odell et al. ................... 709/206
2003/0055977 A1 *  3/2003   Miller ........................... 709/227
(Continued)

FOREIGN PATENT DOCUMENTS

JP    2004-266331    9/2004
JP    2004-336256    11/2004
(Continued)

OTHER PUBLICATIONS
International Search Report dated Aug. 25, 2009.
3GPP TS 23.402 V8.0.0, "Architecture enhancements for non-3GPP accesses (Release 8)," Dec. 2007, pp. 1-131.
L Blunk, et al., "PPP Extensible Authentication Protocol (EAP)," IETF RFC 2284, Mar. 1998, pp. 1-15.
(Continued)

*Primary Examiner* — Mohammad Adhami
(74) *Attorney, Agent, or Firm* — Dickinson Wright PLLC

(57) ABSTRACT

Disclosed is a technique to enable a session handover between devices with different key generation functions in an authentication protocol. According to the technique, when a session where a UE (200) receives contents from a contents server (700) is to be handed over to a target node (300), the UE firstly transfers information (session HO information) necessary to the session handover to the target node (Step S1001). The target node performs authentication processing with an authentication server (600) of the network to which the UE is connected and notifies the authentication server of the session HO information transferred from the UE (Step S1003). The authentication server performs authentication for the session handover based on the session HO information, and when the authentication succeeds, the session is handed over from the contents server to the target node, and the contents are distributed to the target node (Step S1005).

19 Claims, 9 Drawing Sheets

(56) References Cited

U.S. PATENT DOCUMENTS

| | | | |
|---|---|---|---|
| 2003/0101343 A1* | 5/2003 | Eaton et al. | 713/170 |
| 2006/0135124 A1 | 6/2006 | Kaneko | |
| 2007/0094490 A1* | 4/2007 | Lohr | 713/153 |
| 2007/0121642 A1* | 5/2007 | Battin et al. | 370/395.2 |
| 2007/0291694 A1* | 12/2007 | Zhang | 370/331 |
| 2009/0061878 A1* | 3/2009 | Fischer | 455/436 |
| 2009/0217048 A1* | 8/2009 | Smith | 713/176 |
| 2010/0135205 A1* | 6/2010 | Li et al. | 370/328 |
| 2012/0096520 A1* | 4/2012 | Dutta et al. | 726/4 |

FOREIGN PATENT DOCUMENTS

| | | |
|---|---|---|
| JP | 2007-515814 | 6/2007 |
| JP | 2007-306312 | 11/2007 |
| WO | 2005/015938 | 2/2005 |
| WO | 2007/005309 | 1/2007 |
| WO | 2007/103055 | 9/2007 |

OTHER PUBLICATIONS

B. Aboba, et al., "Extensible Authentication Protocol (EAP)," IETF RFC 3748, Jun. 2004, pp. 1-67.

H. Haverinen, et al., "Extensible Authentication Protocol Method for Global System for Mobile Communications (GSM) Subscriber Identity Modules (EAP-SIM)," Jan. 2006, pp. 1-92.

J. Arkko, et al., "Extensible Authentication Protocol Method for 3rd Generation Authentication and Key Agreement (EAP-AKA)," Jan. 2006, pp. 1-79.

3GPP TR 23.893 V8.0.0, "Feasibility Study on Multimedia Session Continuity; Stage 2 (Release 8)," Jun. 2008, pp. 1-62.

3GPP TS 22.168 V8.1.0, "Earthquake and Tsunami Warning System (ETWS) requirements; Stage 1 (Release 8)," Jun. 2008, pp. 1-12.

3GPP TS 36.331 V8.4.0, "Evolved Universal Terrestrial Radio Access (E-UTRA) Radio Resource Control (RRC); Protocol specification (Release 8)," Dec. 2008, pp. 1-198.

* cited by examiner

COMMUNICATION SYSTEM, COMMUNICATION PROCESSING DEVICE AND AUTHENTICATION PROCESSING DEVICE

TECHNICAL FIELD

The present invention relates to a communication technique in a packet-switched data communication network, and more particularly relates to a communication technique when a user equipment (UE) connects with a network using an authentication protocol such as Extensible Authentication Protocol (EAP).

BACKGROUND ART

Currently a system is available providing a communication service using a network configured with a plurality of different types of networks and equipped with a radio communication function such as cellular communication covering a middle and long-distance service area by one base station and a wireless Local Area Network (LAN) function covering a relatively short-distance service area. A radio communication terminal connectable with these networks also is available.

In Third Generation Partnership Project (3GPP), a wireless communication terminal and the relating communication techniques are being discussed, the wireless communication terminal having a communication function with various different types of networks such as a wireless LAN, other cellular networks (including networks before second generation, and 3GPP2 network), Worldwide Interoperability for Microwave Access (WiMAX), IEEE802.16 type wireless wide area network (WWAN) in addition to a 3GPP network (hereinafter referred to as a 3G network) as such a network configured with a plurality of different types of networks.

Particularly, discussion is being conducted to implement seamless mobility and add a mobility service to a session such as real time video or Voice over Internet Protocol (VoIP) in such different types of networks. For instance, the following Non-Patent Document 1 considers a relationship between a 3G network and a non 3G network in the different types of network environment, mainly considering a physical handover of a UE between different types of networks.

In these networks, specifications on authentication, access control and accounting also are important requirements. For instance, in a cellular network, it is being considered to perform authentication based on functions of Authentication and Key Agreement (AKA) in Universal Mobile Telecommunications System (UMTS) and GSM Subscriber Identification Module (SIM) in Global System for Mobile Communications (GSM).

Many of these functions are used for example in a communication method using EAP described in the following Non-Patent Document 2 and the following Non-Patent Document 3. For instance, in EAP-SIM described in the following Non-Patent Document 4, authentication and a session key are exchanged using information in a SIM card based on an EAP protocol. EAP-AKA described in the following Non-Patent Document 5 is expanded so as to be used in a 3G network with consideration given to compatibility with authentication in GSM, In Institute of Electrical and Electronic Engineers (IEEE) 802.1X as an authentication standard used for LAN connection also, authentication is possible using various EAPs such as EAP-Message Digest version 5 (EAP-MD5) and EAP-Transport Layer Security (EAP-TSL).

Meanwhile, the following Non-Patent Document 6 describes a technique relating to session mobility when transferring a communication session performed by a UE to another UE. This technique described in Non-Patent Document 6 is considering the continuity of a session when a part or the entire session a certain UE uses is transferred to another UE.

The following Non-Patent Document 7 and Non-Patent Document 8 are considering a mechanism to make a notice of disaster information such as an earthquake and a tsunami. A system described in Non-Patent Document 7 is to make a notice of disaster information using a 3GPP network when a disaster such as an earthquake or a tsunami occurs, which is called an Earthquake Tsunami Warning System (ETWS).

This ETWS is a system to notice a terminal (UE: User Equipment) of occurrence of a disaster, notifying the UE of a first notification (hereinafter referred to as a primary notification) on the occurrence of about 100 kinds disasters such as an earthquake and a tsunami and a second notification (hereinafter referred to as a secondary notification) on detailed information on the disasters.

More specifically, when a disaster occurs, a base station is notified of the occurrence of the disaster from the 3G network side, and the base station urgently notifies a terminal as notification information. The base station is required to notify the terminal of the first notification within 4 seconds after reception of the primary notification. For this urgent notification on the primary notification to the terminal, it is considered to make such a notification as system information. Further, as for system information such as urgent access class control due to a rapid traffic increase in a communication cell in addition to such an urgent disaster notification, a notification of a change is made within a specific period (modification period), whereby access control of a terminal can be performed more minutely.

At least a primary notification has to he provided to a terminal at the highest priority, and it is being considered to make a notification of secondary information with a Multimedia Broadcast and Multicast Service (MBMS) in the future. Further, discussion is being conducted as to whether or not a notification service of disaster information in the ETWS is to be provided not only to a macro base station (NE/eNB) but also to more local base station (HNB/HeNB). From a functional aspect, however, such a service can be provided to a local base station as well.

PRIOR ART DOCUMENT

Non-Patent Document

Non-Patent Document 1: 3GPP TS 23.402 V8.0.0, 2007-12

Non-Patent Document 2: RFC2284, "PPP Extensible Authentication Protocol", March 1998

Non-Patent Document 3: RFC3748, "Extensible Authentication Protocol (EAP)", June 2004

Non-Patent Document 4: RFC4186, "Extensible Authentication Protocol Method for Global System for Mobile Communications (GSM) Subscriber Identity Modules (EAP-SIM)", January 2006

Non-Patent Document 5: RFC4187, "Extensible Authentication Protocol Method for 3rd Generation Authentication and Key Agreement (EAP-AKA)", January 2006

Non-Patent Document 6: 3GPP TR 23.893 V8.0.0, 2008-06 (Chapter 5.4)

Non-Patent Document 7: 3GPP TS 22.168 V8.1.0, Earthquake and Tsunami Warning System (ETWS) requirements, 2008-06

Non-Patent Document 8: 3GPP TS 36.331 V8.4.0, Evolved Universal Terrestrial Radio Access (E-UTRA); Radio Resource Control (RRC); Protocol specification, 2008-12

However, in the case where a mobility service is added to a session between devices that users keep so as to enhance users' convenience, a handover of the session cannot be always implemented freely depending on requirements for operations. That is, in the case of devices without functions required for authentication and devices different in authentication method, a session handover between such devices cannot be implemented in some cases.

For instance, assume that in FIG. 9 when a user's terminal (UE 200) receives a service of real time video from a service network 450 existing in a 3G network 400 with which the UE 200 connects, such a session of real time video is to be handed over to a target node (TV set) 300 existing under (or in a reachable state via a network) the common connection base station 460 (corresponding to a HeNB/Home-GW 100 described later) so as to view the real time video with the target node 300.

At this time, if the target node 300 satisfies requirements for authentication functions to the 3G network 400 similarly to the UE 200 (e.g., in the case where the target node 300 has a SIM card and an authentication key can be used using information in the SIM card because of a relationship with an operator of the 3G network 400 such as a contraction), some operations on the operator side of the 3G network 400 makes the target node 300 authenticated, so that the session handover may be implemented.

However, in many cases the target node 300 such as a TV set typically is not equipped with major functions as a mobile terminal, and simply has an authentication function different from the authentication function (authentication method specified by the operator of the 3G network 400) used for a connection with the 3G network 400. Therefore, even when the target node 300 is owned by the user of the UE 200, authentication with the 3G network 400 will not succeed, so that a connection with the 3G network 400 fails, or a session key of the session from the 3G network 400 cannot be created, thus leading to a problem of a failure in implementation of the session handover.

SUMMARY OF THE INVENTION

In order to cope with the above-stated problems, it is an object of the present invention to provide a communication system, a user equipment and an authentication server enabling a session handover between devices having different key generation functions in an authentication protocol.

In order to fulfill the above-stated object, in a communication system of the present invention, authentication is conducted to hand over a session being communicated between a first network and a first node belonging to the first network to a second node belonging to a second network different from the first network using authentication information with the first network kept by the first node.

This configuration enables a session handover between devices with different key generation functions in an authentication protocol.

In order to fulfill the above-stated object, a communication processing device of the present invention is included in a first node belonging to a first network in a communication system, and authentication is conducted to hand over a session being communicated between the first node and the first network to a second node belonging to a second network different from the first network using authentication information with the first network kept by the first node. When the second node conducts authentication processing for the session handover with an authentication server of the first network, the second node is notified of information necessary to authentication for the session handover so as to notify the authentication server of the information.

With this configuration, the second node as a session handover target conducts authentication processing, thus enabling a session handover between devices with different key generation functions in an authentication protocol.

In order to fulfill the above-stated object, a communication processing device of the present invention is included in a first node belonging to a first network in a communication system, and authentication is conducted to hand over a session being communicated between the first node and the first network to a second node belonging to a second network different from the first network using authentication information with the first network kept by the first node. When authentication processing is conducted for the session handover with an authentication server of the first network, the authentication server is notified of identification information on the second node.

With this configuration, the first node as a session handover source conducts authentication processing, thus enabling a session handover between devices with different key generation functions in an authentication protocol.

In order to fulfill the above-stated object, a communication processing device of the present invention is included in a second node belonging to a second network different from a first network in a communication system, and authentication is conducted to hand over a session being communicated between a first node belonging to the first network and the first network to the second node using authentication information with the first network kept by the first node. When information necessary to authentication for the session handover is received from the first node and authentication processing is conducted for the session handover with an authentication server of the first network, the authentication server is notified of information generated based on the information necessary to authentication for the session handover.

With this configuration, the second node as a session handover target conducts authentication processing, thus enabling a session handover between devices with different key generation functions in an authentication protocol.

In order to fulfill the above-stated object, a communication processing device of the present invention is included in a second node belonging to a second network different from a first network in a communication system, and authentication is conducted to hand over a session being communicated between a first node belonging to the first network and the first network to the second node using authentication information with the first network kept by the first node. When the first node conducts authentication processing for the session handover with an authentication server of the first network, the first node is notified of identification information on the second node so as to notify the authentication server of the information.

With this configuration, the first node as a session handover source conducts authentication processing, thus enabling a session handover between devices with different key generation functions in an authentication protocol.

In order to fulfill the above-stated object, an authentication processing device of the present invention is included in an authentication server belonging to a first network in a communication system, and authentication is conducted to hand over a session being communicated between a first node belonging to the first network and the first network to a second node belonging to a second network different from the first network using authentication information with the first network kept by the first node. When authentication processing is conducted for the session handover with the second node, information generated based on information necessary to authentication for the session handover that the second node receives from the first node is received from the second node, and authentication for the session handover is conducted using the information generated based on information necessary to authentication for the session handover.

With this configuration, the second node as a session handover target conducts authentication processing, thus enabling a session handover between devices with different key generation functions in an authentication protocol.

In order to fulfill the above-stated object, an authentication processing device of the present invention is included in an authentication server belonging to a first network in a communication system, and authentication is conducted to hand over a session being communicated between a first node belonging to the first network and the first network to a second node belonging to a second network different from the first network using authentication information with the first network kept by the first node. When authentication processing is conducted for the session handover with the first node, identification information on the second node is received from the first node.

With this configuration, the first node as a session handover source conducts authentication processing, thus enabling a session handover between devices with different key generation functions in an authentication protocol.

The present invention is configured as stated above, and has an advantage of enabling a session handover between devices with different key generation functions in an authentication protocol.

DESCRIPTION OF EMBODIMENTS

The following describes the first and second embodiments of the present invention, with reference to the drawings. To begin with, a network system configuration in the first and second embodiments of the present invention is described below.

Figure 1:
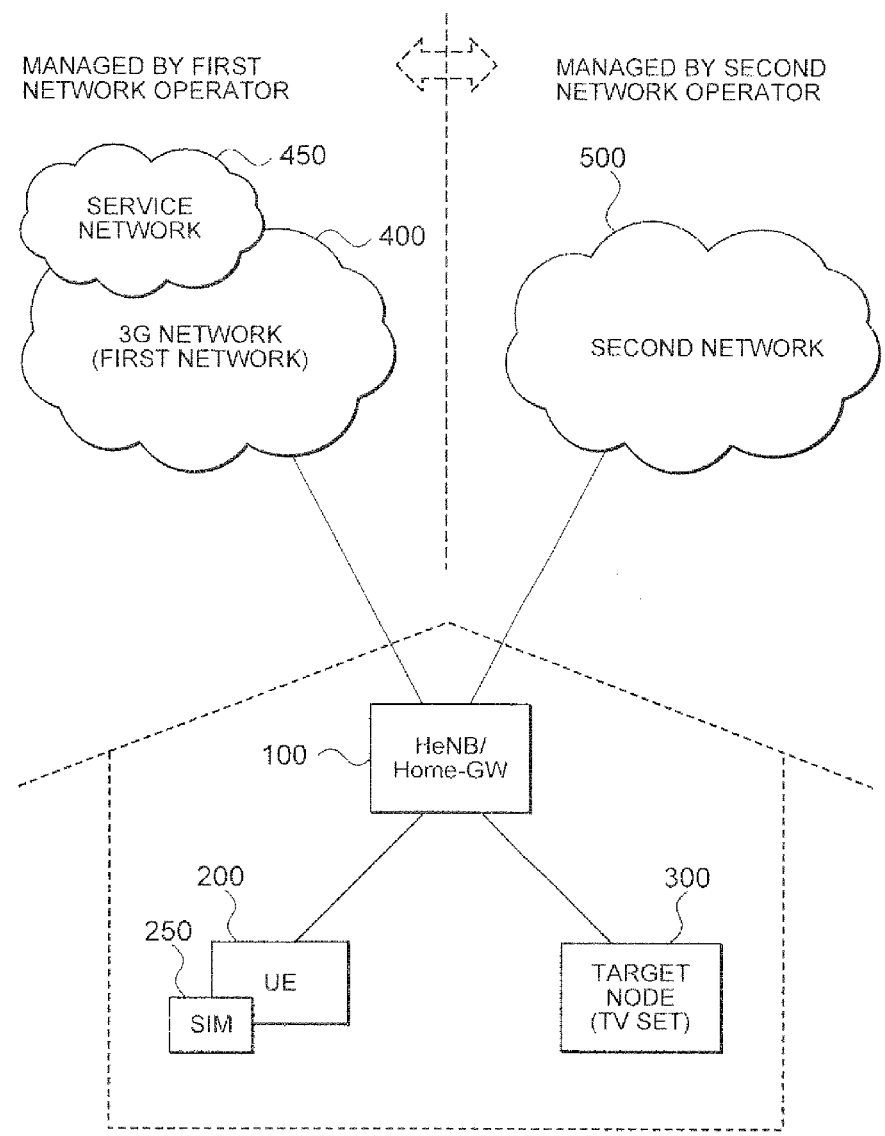
FIG. 1 illustrates an exemplary network system configuration in the first and second embodiments of the present invention.

FIG. 1 illustrates an exemplary network system configuration in the first and second embodiments of the present invention. In the network system illustrated in FIG. 1, a UE (e.g., a 3G communicable mobile phone) 200 of a user connects with a 3G network (first network) 400 managed by a first network operator via a small-sized base station (HeNB:Home eNB) installed in a house of the user. Assume herein that the UE 200 completes authentication using EAP with the first network operator managing the 3G network 400, and receives delivery of the contents (e.g., real time video) from a contents server (not illustrated in FIG. 1, corresponding to a contents server 700 described later) in a service network 450.

A target node (e.g., TV set) 300 connects with a network 500 managed by a second network operator (network operator different from the first network operator) via a home gateway (Home-GW). Herein, the HeNB and the Home-GW are installed in the same device, and the HeNB and the Home-GW are described collectively as a HeNB/Home-GW 100. However, the HeNB and the Home-GW may be separated. Although authentication is conducted also between the target node 300 and the second network operator, the authentication is conducted using an authentication function and an authentication key different from those between the UE 200 and the first network operator. That is, the UE 200 has a SIM card (SIM) 250 that can be used for authentication in the 3G network 400, whereas the target node 300 does not have the SIM card 250 that can be used for authentication in the 3G network 400. Herein, a part or all of authentication entity functions functioning as an authentication server in connection with the 3G network 400 may be implemented in the HeNB/Home-GW 100, or may be implemented in any other node in the 3G network 400.

<First Embodiment>

The following describes the first embodiment of the present invention. The first embodiment of the present invention describes a method letting the target node 300 receive a session handover from the 3G network 400 side using information (hereinafter called SIM information) in the SIM card 250 that the UE 200 can read.

Figure 2:
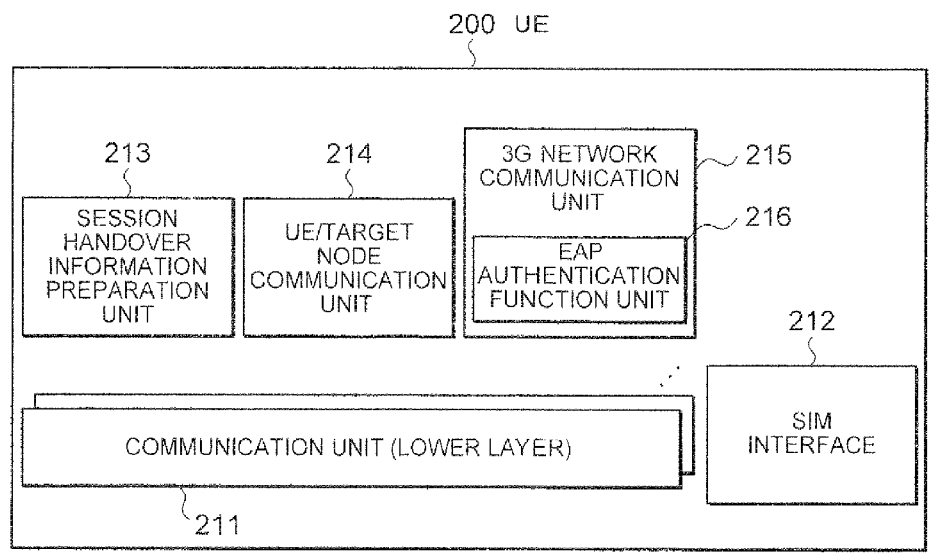
FIG. 2 illustrates an exemplary configuration of a UE in the first embodiment of the present invention.

FIG. 2 illustrates an exemplary configuration of a UE in the first embodiment of the present invention. The UE 200 illustrated in FIG. 2 includes: a communication unit (lower layer) 211; a SIM interface 212; a session handover information preparation unit 213; a UE/target node communication unit 214; and a 3G network communication unit 215, where the 3G network communication unit 215 further includes an EAP authentication function unit 216.

The communication unit (lower layer) 211 represents a communication function for communication with other nodes, including one or a plurality of network interfaces. In the case where the UE 200 is a mobile phone, the communication unit (lower layer) 211 is equipped with a wireless communication function. This communication function of the communication unit (lower layer) 211 enables the UE 200 to conduct communication with a node connecting with the 3G network 400 and other networks, as well as communication with the target node 300.

The SIM interface 212 is equipped with a function to read SIM information stored in the SIM card 250 (or a USIM (Universal Subscriber Identity Module) card) attached to the UE 200. Herein, the SIM interface 212 and the SIM card 250 are examples for the case of a connection with the 3G network 400 (the case where the UE 200 is a mobile phone) especially, which can be replaced with a function to keep, acquire and generate information that the UE 200 uses for authentication.

The session handover information preparation unit 213 is equipped with a function to fetch, from SIM information that the SIM interface 212 can read from the SIM card 250, information (hereinafter described as session HO (handover) information) required for authentication of a session handover and prepare for transferring of the session HO information to the target node 300. Herein the transfer preparation (or actual transferring) of the session HO information can be executed at any timing initiated by an input instruction by a user, a request from the target node 300, or an instruction from the network side, for example.

The UE/target node communication unit 214 is equipped with a function to allow the UE 200 to conduct communication with the target node 300. The UE/target node communication unit 214 can transmit the session HO information prepared by the session handover information preparation unit 213 to the target node 300. Herein, as described later, the UE 200 and the target node 300 preferably establish credibility therebetween, and the session HO information preferably is transmitted by the UE/target node communication unit 214 to the target node 300 in a secure state.

The 3G network communication unit 215 is equipped with a function to allow the UE 200 to conduct communication with any node in the 3G network 400. The 3G network communication unit 215 further can receive contents (e.g., real time video) from a server (e.g., a contents server 700 described later) in the service network 450 belonging to the 3G network 400. When authentication for a session handover succeeds, the 3G network communication unit 215 may transmit a signaling to hand over a session to a node (e.g., an authentication server 600 of the 3G network 400) in the 3G network 400, or may transmit a start instruction of the session handover to the target node 300, thus making the target node 300 transmit signaling for a session handover.

The EAP authentication function unit 216 of the 3G network communication unit 215 is equipped with a function to conduct EAP authentication with the 3G network 400 (e.g., authentication server 600 described later) when the DE 200 connects with the 3G network 400. This EAP authentication is the same as the EAP authentication conducted by the conventional UE 200, which is implemented using SIM information that the SIM interface 212 reads from the SIM card 250.

Figure 3:
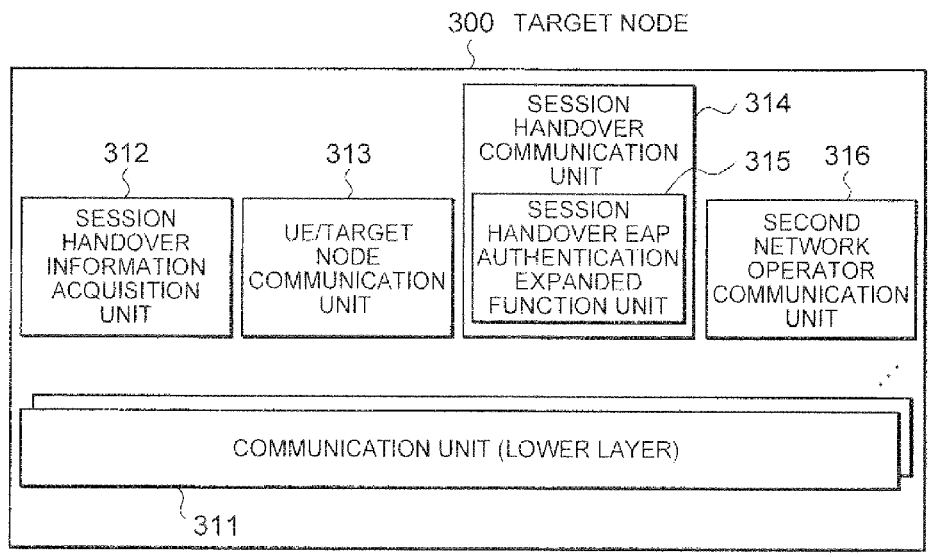
FIG. 3 illustrates an exemplary configuration of a target node in the first embodiment of the present invention.

FIG. 3 illustrates an exemplary configuration of a target node in the first embodiment of the present invention. The target node 300 illustrated in FIG. 3 includes: a communication unit (lower layer) 311; a session handover information acquisition unit 312; a UE/target node communication unit 313; a session handover communication unit 314; and a second network operator communication unit 316, where the session handover communication unit 314 further includes a session handover EAP authentication expanded function unit 315.

The communication unit (lower layer) 311 represents a communication function for communication with other nodes, including one or a plurality of network interfaces. This communication function of the communication unit (lower layer) 311 enables the target node 300 to conduct communication with a node connecting with a second network 500 and other networks, as well as communication with the UE 200.

The session handover information acquisition unit 312 is equipped with functions to acquire session HO information that the UE/target node communication unit 313 receives from the UE 200, conduct a preprocessing thereto if required, and then pass the same to the session handover EAP authentication expanded function unit 315.

The UE/target node communication unit 313 is equipped with a function to allow the target node 300 to conduct communication with the UE 200. The UE/target node communication unit 313 can receive the session HO information transmitted from the UE 200. Herein, as described later, the UE 200 and the target node 300 preferably establish credibility therebetween, and the UE/target node communication unit 313 preferably receives the session HO information from the UE 200 in a secure state.

The session handover communication unit 314 is equipped with a function to conduct processing to inherit a session that the UE 200 keeps with the 3G network 400. When authentication for a session handover succeeds in the session handover EAP authentication expanded function unit 315, the session handover communication unit 314 may transmit signaling to hand over a session to a node (e.g., an authentication server 600 of the 3G network 400) in the 3G network 400, or may receive a start instruction of a session handover from the UE 200 and then transmit signaling for a session handover.

The session handover EAP authentication expanded function unit 315 of the session handover communication unit 314 is equipped with a function to conduct EAP authentication with the 3G network 400 (e.g., an authentication server 600) in order to inherit a session that the UE 200 keeps with the 3G network 400. Herein, during the EAP authentication procedure with the 3G network 400, the session handover EAP authentication expanded function unit 315 uses the session HO information acquired from the session handover information acquisition unit 312 to be authenticated, while exchanging a session key of a session that the target node 300 tries to receive.

The second network operator communication unit 316 is equipped with a function to allow the target node 300 to conduct communication with any node in the second network 500. Herein, the second network operator communication unit 316 further conducts authentication processing when the target node 300 connects with the second network 500.

Figure 4:
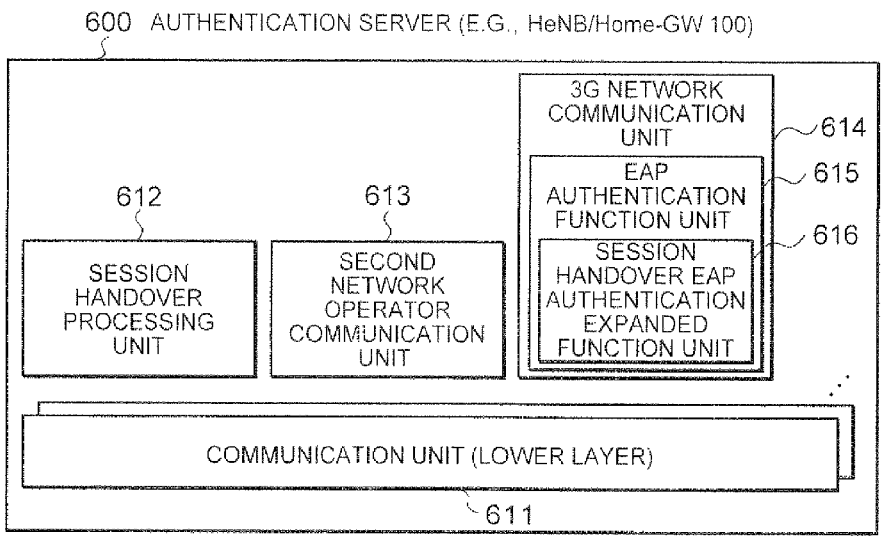
FIG. 4 illustrates an exemplary configuration of an authentication server in the first and second embodiments of the present invention.

FIG. 4 illustrates an exemplary configuration of an authentication server in the first embodiment of the present invention. The authentication server 600 illustrated in FIG. 4 includes: a communication unit (lower layer) 611; a session handover processing unit 612; a second network operator communication unit 613; and a 3G network communication unit 614, where the 3G network communication unit 614 further includes an EAP authentication function unit 615 and the EAP authentication function unit 615 further includes a session handover EAP authentication expanded function unit 616. Herein, the functions of the authentication server 600 illustrated in FIG. 4 may be implemented in any node (e.g., HeNB/Home-GW 100) belonging to the 3G network 400 or may be distributed over a plurality of nodes (e.g., an authentication entity may be configured in multi stages in the 3G network 400).

The communication unit (lower layer) 611 represents a communication function for communication with other nodes, including one or a plurality of network interfaces. This communication function of the communication unit (lower layer) 611 enables communication with a node connecting with the second network 500 and other networks, as well as communication with the UE 200 and the target node 300.

When the EAP authentication by the session handover EAP authentication expanded function unit 616 authorizes transmission of a session that the UE 200 keeps with the 3G network 400 to the target node 300, the session handover processing unit 612 is equipped with a function to hand over the session from the UE 200 to the target node 300. Herein, the session handover processing unit 612 may instruct a sender of this session (e.g., the contents server 700) or a node as a pass point of the session to switch a destination of the session from the UE 200 to the target node 300 (this may be via the second network), or in the case where the authentication server 600 is implemented in a node as a pass point of this session (e.g., in the case where the authentication server 600 is implemented in the HeNB/Home-GW 100), the destination of the session may be switched from the UE 200 to the target node 300 by its own node (e.g., the HeNB/Home-GW 100). Herein, when the processing for authentication of a session handover and the actual session handover processing are separated, after EAP authentication by the session handover HAP authentication expanded function unit 616 is completed, the authentication server 600, the UE 200, the target node 300, and other nodes in the 3G network 400 may start the actual session handover processing so as to switch the destination of the session from the UE 200 to the target node 300. Especially, when the UE 200 and the target node 300 use a SIP (Session Initiation Protocol) for session control as an upper layer protocol, a session can be switched using a DIFFER message and an INVITE message specified by the SIP.

The second network operator communication unit 613 is equipped with a function to enable the authentication server 600 to conduct communication with any node (e.g., the target node 300) belonging to the second network 500.

The 3G network communication unit 614 is equipped with a function to enable the authentication server 600 to conduct communication with any node in the 3G network 400. The actual session handover may be conducted within the 3G network 400 as in the case where the authentication server 600 issues a session switching instruction to the contents server 700, and the contents server 700 distributes contents to the target node 300, or a contents distribution target may be switched from the UE 200 to the target node 300 at a branchpoint like the HeNB/Home-GW 100. When the session handover authentication succeeds, the 3G network communication unit 614 may transmit signaling to switch a transfer destination of the session from the UE 200 to the target node 300 to a device transferring data relating to the session (a device relaying the session, or the contents server 700 as the sender of the session). When the authentication server 600 itself relays the session (e.g., the authentication server 600 is implemented in the HeNB/Home-GW 100), this device itself may switch the session transfer destination from the UE 200 to the target node 300.

The EAP authentication function unit 615 of the 3G network communication unit 614 is equipped with a function to conduct EAP authentication with the UE 200 when the UE 200 connects with the 3G network 400.

The session handover EAP authentication expanded function unit 616 of the EAP authentication function unit 615 is equipped with a function to conduct EAP authentication with the target node 300 that tries to inherit the session the UE 200 keeps with the 3G network 400. Herein, the session handover EAP authentication expanded function unit 616 receives session HO information from the target node 300 during the EAP authentication procedure with the target node 300, thereby conducting authentication of a holder (the UE 200) of the session that the target node 300 tries to inherit, thus exchanging a session key of the session that the target node 300 tries to receive with the target node 300.

Figure 5:
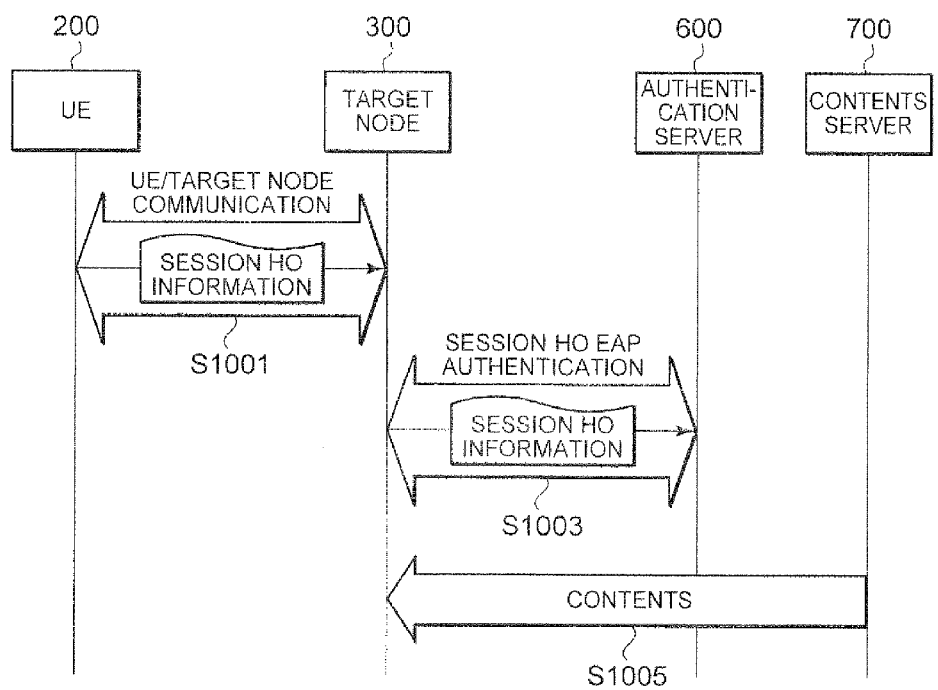
FIG. 5 is a sequence chart illustrating an exemplary operation in the first embodiment of the present invention.

The following describes an operation in the first embodiment of the present invention, based on the network system configuration of FIG. 1, and the configurations of the UE 200 illustrated in FIG. 2, the target node 300 illustrated in FIG. 3, and the authentication server illustrated in FIG. 4. FIG. 5 is a sequence chart illustrating an exemplary operation in the first embodiment of the present invention.

In FIG. 5, when a session handover starts from the UE 200 to the target node 300, firstly the session handover information preparation unit 213 of the UE 200 fetches session HO information from SIM information that can be read from the SIM card 250 attached in the UE 200 itself, and prepares for transferring of the session information to the target node 300. The session HO information contains information required to authenticate the session handover. However, in the case where a specific session only is to be transmitted from the UE 200 to the target node 300, information to specify such a session (or information required to hand over the session) may be contained.

At this time, as for the session HO information, an arrangement is preferably made beforehand with the first network operator managing the 3G network 400. It is particularly preferable that the session HO information is configured with information relating to time series (serial number, time information or the like), is configured to enable a limitation to only once use (one-time use) (consideration given to replay attack tolerance), is configured to prevent analogy of original information elements using hash function, or is separated from information used for normal connection authentication so that a connection for other communication will not be influenced even if information elements should be leaked.

Next, the UE/target node communication unit 214 of the UE 200 transmits the thus prepared session HO information to the target node 300 (Step S1001). Herein, the UE 200 and the target node 300 preferably establish credibility therebetween. For instance, preferably the uniqueness of the respective devices and being the intended devices are confirmed by an authentication function between devices other than an authentication function for connection with a network operator, and further preferably it is confirmed that a third party does not collect or tamper with information (e.g., encrypted). At this time, EAP authentication may be performed between the UE 200 and the target node 300, for example.

Further, communication may be conducted between the UE 200 and the target node 300 via direct link (including wired connection) such as short-distance radio communication, or communication may be conducted through a communication path via the 3G network 400, a network (the second network 500 managed by the second network operator) to which the target node 300 belongs, or both of the networks. Further, communication may be conducted via the HeNB/Home-GW 100.

Receiving the session 110 information from the UE 200 at Step S1001, the target node 300 makes the session handover EAP authentication expanded function unit 315 conduct EAP authentication for the 3G network 400 using information generated based on the session HO information received from the HE 200 (Step S1003). At this time, the authentication server 600 as an authentication target can be indicated from the 3G network 400 side and the UE 200. Further, the authentication server 600 may be an integrated device such as the HeNB/Home-GW 100 or a device as a branchpoint of information transferring.

In this example, since the Home-GW and the HeNB typically subjected to EAP authentication by the target node 300 are a single device (HeNB/Home-GW 100), the target node 300 uses session HO information (or information that can be generated as an authentication key based on this information) during HAP authentication for the 3G network 400 so as to acquire information such as a session key, whereby authentication for a session handover can be completed. Herein, in the case where access authentication between the target node 300 and the Home-GW has been already completed by the conventional access authentication operation, the HeNB may conduct re-authentication or additional authentication for the target node 300.

The authentication server 600 makes the session handover EAP authentication expanded function unit 315 conduct authentication for a session handover based on the session HO information received from the target node 300 so as to verify the UE 200 as a session handover source, while specifying the target node 300 as a session handover target. When the authentication for a session handover is completed, the session handover processing unit 612 of the authentication server 600 starts processing to hand over the session from the UE 200 to the target node 300. Thereby, the 3G network 400 side makes the session of the contents (real time video) that has been transmitted to the UE 200 handed over to the target node 300, so that the session of the contents (real time video) is transferred to the target node 300 and the contents (real time video) are distributed from the contents server 700 over the service network 450 to the target node 300 (Step S1005).

Herein, in the case a specific session is designated for handover, the 3G network 400 side makes such a session only handed over. Further, the actual handover may be conducted within the 3G network 400, e.g., the authentication server 600 issues a switching instruction of a session to the contents server 700 and the contents server 700 distributes the contents to the target node 300, or a contents distribution destination may be switched from the UE 200 to the target node 300 at a branchpoint like the HeNB/Home-GW 100. As the session handover procedure based on success in authentication from the authentication server 600 to the contents server 700, any method is available. The drawing also does not describe the procedure between these two servers (or an intervening party may exist therebetween).

With the above-stated authentication method, the target node 300 can complete authentication for a session handover even when it is impossible to conduct direct EAP authentication with its own authentication information (such as an ID of the target node 300). Herein, even when a session handover to the target node 300 is conducted, the right of the session (or responsibility for accounting) still remains in the UE 200.

As for a session handover to return a session once transferred to the target node 300 to the original UE 200, since the UE 200 keeps the original authentication information, preparation for the session handover is completed as it is when the authentication relationship is maintained. Even when the authentication relationship is not maintained, authentication is conducted again, whereby preparation for the session handover is completed. Thereafter, when the UE 200 or the target node 300 to which the session is transferred starts a procedure for the session handover, the 3G network 400 side makes the session of the contents (real time video) that has been transmitted to the target node 300 handed over to the UE 200, whereby the session can be returned to the UE 200.

Note here that a part or the entire communication from the UE 200 or the target node 300 to the 3G network, a handover from the UE 200 to the target node 300, a handover from the target node 300 to the UE 200 and the like may be initiated from the network side. When a session transferred to the target node 300 is further handed over to another target node, the original target node 300 may transfer information required for the session handover to the other target node 300 (the next target node 300) so as to implement the session handover.

However, considering the nature of authentication information (or considering a replay attack tolerance function), the UE 200 preferably conducts the above-stated procedure again to the next target node 300. Alternatively, the session may be simply returned to the UE 200, and then the above-stated procedure may be conducted to implement a session handover to another target node 300.

<Second Embodiment>

The following describes the second embodiment of the present invention. The second embodiment of the present invention describes a method in which a UE 200 executes a session handover to a target node using SIM information that the LIE 200 can read and information on the target node.

Figure 6:
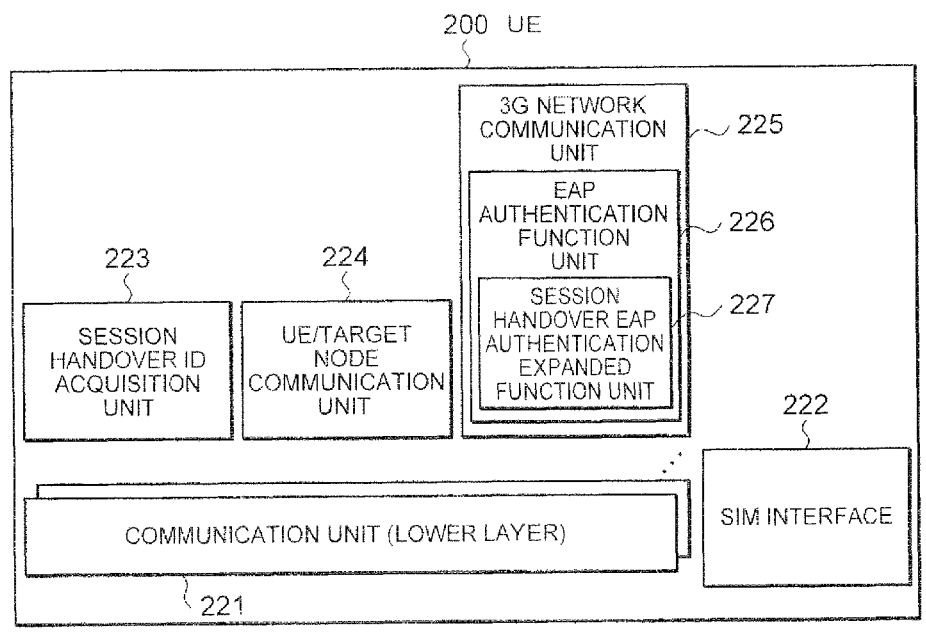
FIG. 6 illustrates an exemplary configuration of a UE in the second embodiment of the present invention.

FIG. 6 illustrates an exemplary configuration of a UE in the second embodiment of the present invention. The UE 200 illustrated in FIG. 6 includes: a communication unit (lower layer) 221; a SIM interface 222; a session handover ID acquisition unit 223; a UE/target node communication unit 224; and a 3G network communication unit 225, where the 3G network communication unit 225 further includes an EAP authentication function unit 226, and the EAP authentication function unit 226 further includes a session handover EAP authentication expanded function unit 227.

The communication unit (lower layer) 221 represents a communication function for communication with other nodes, including one or a plurality of network interfaces. In the case where the UE 200 is a mobile phone, the communication unit (lower layer) 221 is equipped with a wireless communication function. This communication function of the communication unit (lower layer) 221 enables the UE 200 to conduct communication with a node connecting with a 3G network 400 and other networks, as well as communication with a target node 300.

The SIM interface 222 is equipped with a function to read SIM information stored in a SIM card 250 (or a USIM card) attached to in the UE 200. Herein, the SIM interface 222 and the SIM card 250 are examples for the case of a connection with the 3G network 400 (the case where the UE 200 is a mobile phone) especially, which can be replaced with a function to keep, acquire and generate information that the UE 200 uses for authentication.

The session handover ID acquisition unit 223 is equipped with a function to acquire identification information (ID of the target node 300) on the target node 300 that the UE/target node communication unit 224 receives from the UE 200 and pass the same to the session handover EAP authentication expanded function unit 227 of the 3G network communication unit 225.

The UE/target node communication unit 224 is equipped with a function to allow the UE 200 to conduct communication with the target node 300. The UE/target node communication unit 224 can receive identification information on the target node 300 that the target node 300 transmits. As described later, the UE 200 and the target node 300 may establish credibility therebetween, and in this case the identification information on the target node 300 that the UE/target node communication unit 224 receives from the target node 300 can be transmitted in a secure state.

The 3G network communication unit 225 is equipped with a function to allow the UE 200 to conduct communication with any node in the 3G network 400. The 3G network communication unit 215 further can receive contents (e.g., real time video) from a contents server on a service network 450 belonging to the 3G network 400. When authentication for a session handover succeeds, the 3G network communication unit 215 may transmit signaling to hand over a session to a node (e.g., an authentication server 600 of the 3G network 400) in the 3G network 400, or may transmit a start instruction of a session handover to the target node 300, thus making the target node 300 transmit signaling for a session handover.

The EAP authentication function unit 226 of the 3G network communication unit 225 is equipped with a function to conduct EAP authentication with the 3G network 400 (e.g., authentication server 600) when the UE 200 connects with the 3G network 400. This EAP authentication is conducted using SIM information that the SIM interface 222 reads from the SIM card 250.

The session handover EAP authentication expanded function unit 227 of the EAP authentication function unit 226 is equipped with a function to conduct EAP authentication with the 3G network 400 (e.g., an authentication server 600) so as to hand over a session that the UE 200 keeps with the 3G network 400 to the target node 300. Herein, during the EAP authentication procedure with the 3G network 400, the session handover EAP authentication expanded function unit 227 notifies the 3G network 400 of the identification information on the target node 300 acquired from the session handover ID acquisition unit 223, thus allowing the 3G network 400 to specify the target node 300, and requests to transfer the session to such a target node 300.

Figure 7:
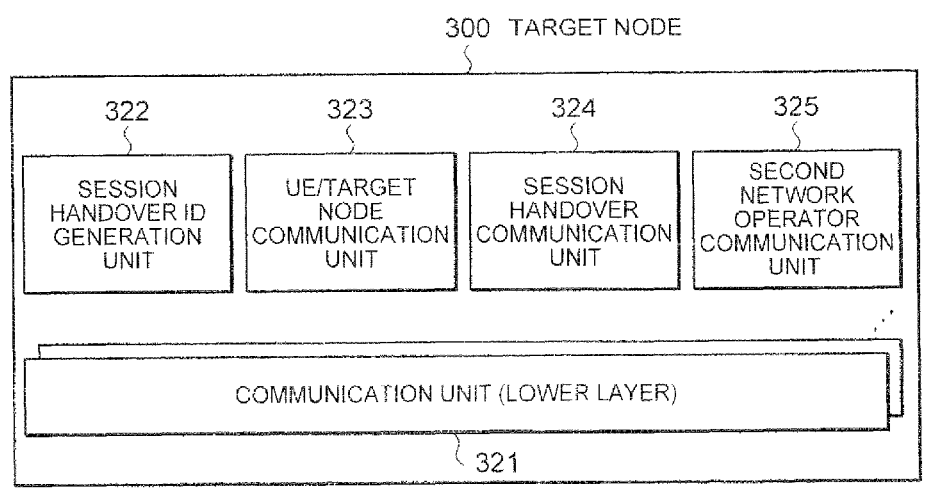
FIG. 7 illustrates an exemplary configuration of a target node in the second embodiment of the present invention.

FIG. 7 illustrates an exemplary configuration of a target node in the second embodiment of the present invention. The target node 300 illustrated in FIG. 7 includes: a communication unit (lower layer) 321; a session handover ID generation unit 322; a UE/target node communication unit 323; a session handover communication unit 324; and a second network operator communication unit 325.

The communication unit (lower layer) 321 represents a communication function for communication with other nodes, including one or a plurality of network interfaces. This communication function of the communication unit (lower layer) 321 enables the target node 300 to conduct communication with a node connecting with a second network 500 and other networks, as well as communication with the UE 200.

The session handover ID generation unit 322 is equipped with a function to generate identification information on the target node 300 (information enabling the 3G network 400 to specify the target node 300) required to inherit the session that the UE 200 keeps with the 3G network 400. Herein, the generation of identification information on the target node 300 for the 200 (or notification to the UE 200) may be conducted beforehand (before a decision to conduct a session handover) or may be conducted after a decision is made to conduct a session handover.

The UE/target node communication unit 323 is equipped with a function to allow the target node 300 to conduct communication with the UE 200. The UE/target node communication unit 323 can transmit identification information on the target node 300 generated by the session handover 1D generation unit 322 to the UE 200. Herein, as described later, the UE 200 and the target node 300 may establish credibility therebetween, and in this case the UE/target node communication unit 323 can transmit the identification information on the target node 300 to the target node 300 in a secure state.

The session handover communication unit 324 is equipped with a function to conduct processing to inherit a session that the UE 200 keeps with the 3G network 400. The session handover communication unit 324 can transmit the identification information on the target node 300 generated by the session handover ID generation unit 322 to the UE 200.

The second network operator communication unit 325 is equipped with a function to allow the target node 300 to conduct communication with any node in the second network 500. Herein, the second network operator communication unit 325 further conducts authentication processing when the target node 300 connects with the second network 500.

An authentication server 600 in the second embodiment of the present invention has a configuration similar to that of the authentication server 600 illustrated in FIG. 4, but is different in that information relating to EAP authentication is received from the UE 200 for processing in the second embodiment, whereas information relating to EAP authentication is received from the target node 300 for processing in the above-stated first embodiment.

That is, the session handover EAP authentication expanded function unit 616 of the EAP authentication function unit 615 of the authentication server 600 in the second embodiment of the present invention is equipped with a function to conduct EAP authentication with the LIE 200 that tries to hand over the session the UE 200 keeps with the 3G network 400 to the target node 300. Herein, the session handover EAP authentication expanded function unit 616 receives identification information on the target node 300 from the UE 200 during the EAP authentication procedure with the UE 200, so that the target node 300 to which the UE 200 tries to hand over the session can be specified. Herein, when the processing for authentication of a session handover and the actual session handover processing are separated, for example, after EAP authentication by the session handover EAP authentication expanded function unit 616 is completed, the authentication server 600, the UE 200, the target node 300, and other nodes in the 3G network 400 may start the actual session handover processing so as to switch the destination of the session from the UE 200 to the target node 300. Especially, when the UE 200 uses a SIP for session control as an upper layer protocol, a session can be switched using a RE-INVITE message and the like specified by the SIP.

Figure 8:
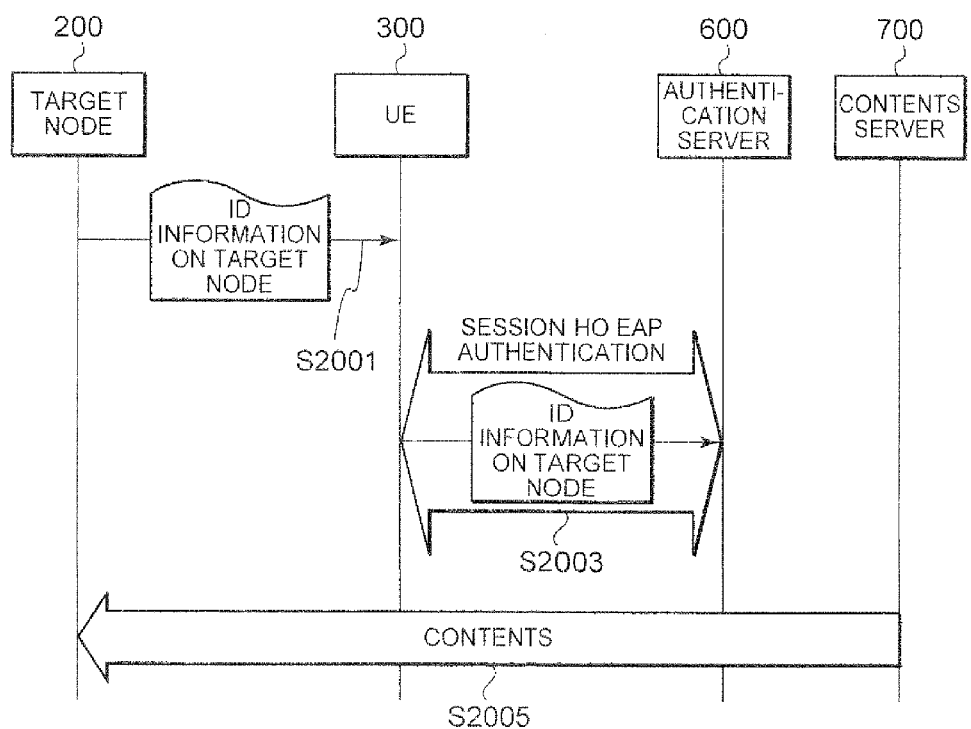
FIG. 8 is a sequence chart illustrating an exemplary operation in the second embodiment of the present invention.

The following describes an operation in the second embodiment of the present invention, based on the network system configuration of FIG. 1, and the configurations of the UE 200 illustrated in FIG. 6, the target node 300 illustrated in FIG. 7, and the authentication server illustrated in FIG. 4. FIG. 8 is a sequence chart illustrating an exemplary operation in the second embodiment of the present invention.

In FIG. 8, when a session handover starts from the UE 200 to the target node 300, firstly the session handover ID acquisition unit 223 of the UE 200 acquires identification information on the target node 300 (Step S2001). Herein, the UE 200 acquires the identification information on the target node 300 from the target node 300 as the session handover starts. However, the UE 200 may use identification information on the target node 300 registered beforehand inside the UE 200, or may acquire such information from the target node 300 as needed. Further, the target node 300 may notify the UE 200 of the identification information on the target node 300 when requesting a session handover from the UE 200.

As the identification information on the target node 300, any information capable of specifying the target node 300 can be used, such as an IP address or a device identification code of the target node 300. This identification information on the target node 300 preferably allows a branchpoint (e.g., the HeNB/Home-GW 100) for a session handover from the UE 200 to the target node 300 or the authentication server 600 for a session handover to specify the target node 300 during authentication and allows the target node 300 to be authenticated.

Herein, similarly to the above-stated first embodiment of the present invention, the UE 200 and the target node 300 preferably establish credibility therebetween. For instance, preferably the uniqueness of the respective devices and being the intended devices are confirmed by an authentication function between devices other than an authentication function for connection with a network operator, and further preferably it is confirmed that a third party does not collect or tamper with information (e.g., encrypted). At this time, EAP authentication may be performed between the UE 200 and the target node 300, for example.

Further, communication may be conducted between the UE 200 and the target node 300 via direct link (including wired communication) such as short-distance radio communication, or communication may be conducted through a communication path via the 3G network 400, a network (the second network 500 managed by the second network operator) to which the target node 300 belongs, or both of the networks. Further, communication may be conducted via the HeNB/Home-GW 100.

Herein, in above-stated first embodiment of the present invention, the session 110 information is passed from the UE 200 to the target node 300, whereas in the second embodiment of the present invention identification information on the target node 300 is passed from the target node 300 to the UE 200. The identification information on the target node 300 is identification information reachable (identifiable) to the target node 300, whereby the UE 200 can identify the target node 300. Thus, compared with the communication notifying of the session HO information (i.e., transmission of the session HO information in the first embodiment of the present invention), the transmission of identification information on the target node 300 in the second embodiment of the present invention has an advantage that encryption and a communication protocol with a low processing load may be used.

Receiving the identification information on the target node 300 at Step S2001, the UE 200 makes the session handover EAP authentication expanded function unit 227 transmit information containing the identification information on the target node 300 as additional information to the authentication server 600 as a connection authentication target of the UE 200 itself for EAP authentication (Step S2003). Herein, when the UE 200 has already completed access authentication with the authentication server 600, EAP re-authentication will be conducted. In the case where a specific session only is to be transferred from the UE 200 to the target node 300, then information to specify the session may be contained as the additional information.

Herein, in this EAP authentication at Step S2003, it may be adapted so that an entity (the contents server 700 or the like) of the service network 450 can be notified of a session to receive the contents being switched to the target node 300. Herein, the connection node of the UE 200 is the HeNB/Home-GW 100, and the UE 200 conceivably conducts connection authentication with the HeNB/Home-GW 100. Therefore, the authentication for a session handover also may be executed with the EAP authentication with the HeNB-Home-GW 100 (the final authentication server 600 may exist in the 3G network 400 or the service network 450).

The authentication server 600 makes the session handover EAP authentication expanded function unit 315 conduct EAP authentication for a session handover with the UE 200. When the authentication for a session handover is completed, the session handover processing unit 612 of the authentication server 600 starts processing to hand over the session to the target node 300 acquired through this authentication processing. The 3G network 400 side makes the session of the contents (real time video) that has been transmitted to the UE 200 handed over to the target node 300, so that the session of the contents (real time video) is transferred to the target node 300 and the contents (real time video) are distributed from the contents server 700 over the service network 450 to the target node 300 (Step S1005).

Herein, in the case a handover of a specific session is designated, the 3G network 400 side makes such a session only handed over. Further, an actual handover may be conducted within the 3G network 400, e.g., the authentication server 600 issues a switching instruction to the contents server 700 and the contents server 700 distributes the contents to the target node 300, or a contents distribution destination may be switched from the UE 200 to the target node 300 at a branchpoint like the HeNB/Home-GW 100. As the session handover procedure based on success in authentication from the authentication server 600 to the contents server 700, any method is available. The drawing also does not describe the procedure between these two servers (or an intervening party may exist therebetween).

With the above-stated authentication method, the target node 300 can complete authentication for a session handover even when it is impossible to conduct direct EAP authentication with its own authentication information (such as identification information on the target node 300). Herein, even when a session handover to the target node 300 is conducted, the right of the session (or responsibility for accounting) still remains in the UE 200.

As for a session handover to return a session once transferred to the target node 300 to the original UE 200, since the UE 200 keeps the original authentication information, preparation for the session handover is completed as it is when the authentication relationship is maintained. Even when the authentication relationship is not maintained, authentication is conducted again, whereby preparation for the session handover is completed. Thereafter, when the UE 200 or the target node 300 to which the session is transferred starts a procedure for the session handover, the 3G network 400 side makes the session of the contents (real time video) that has been transmitted to the target node 300 handed over to the UE 200, whereby the session can be returned to the UE 200.

Note here that a part or the entire communication from the UE 200 or the target node 300 to the 3G network, a handover from the UE 200 to the target node 300, a handover from the target node 300 to the UE 200 and the like may be initiated from the network side. When a session transferred to the target node 300 is further handed over to another target node, the original target node 300 transfers information required for the session handover to the other target node 300 (the next target node 300) so as to implement the session handover. However, considering the nature of authentication information (or considering a replay attack tolerance function), the UE 200 preferably conducts the above-stated procedure again to the next target node 300. Alternatively, the session may be simply returned to the UE 200, and then the above-stated procedure may be conducted to implement a session handover to another target node 300.

Note here that authentication for a session handover according to the present invention preferably is distinguished from normal connection authentication and normal authentication for a session of contents as a target. In the case where the authentication for a session handover according to the present invention is not distinguished from normal connection authentication and authentication for a session but the authentication is conducted uniformly, then other communication for the UE 200 (communication other than a session relating to a session handover) might stop or the connection with the UE 200 might be canceled. In order to avoid such a situation, it is also possible to divide a single session into a plurality of sessions or to divide data used for a single session.

As for the contents, upload-type contents that are data transmitted from the UE 200 or the target node 300 to the network side and bi-directionally exchanged data may exist in addition to a distributed type such as real time video (most of them are contents data distributed from the service network 450, and a node on the contents data reception side conducts communication for control only). Depending on their forms, information to be notified during a session handover (for instance, in the case where a reception address and a transmission address are different from each other) and the detailed authentication procedure might be different. However, such a difference is just a difference in parameter to implement a session handover, and the present invention is applicable irrespective of session types and their directions.

As illustrated in FIG. 1, the above first and second embodiments exemplify the case of a session handover from the UE 200 to the target node 300 existing in the same building. However, the UE 200 and the target node 300 may be owned by different users, and their installation positions (connection positions) may be away from each other.

The number of sessions transferred from the UE 200 to the target node 300 by a session handover according to the present invention may be any number, and only one session or a plurality of sessions (moreover, all sessions of the UE 200) may be transferred. Instead of moving a session, a session may be copied (branched off) so that a session is transferred from the UE 200 to the target node 300, while still letting the UE 200 itself conduct communication relating to the session. In this case, the UE 200 may insert, into the information required for session handover authentication, information requesting session copying so that a session starts between the target node 300 and the first network 400 while leaving currently communicating session by the UE 200 and information requesting session switching to switch a session from the UE 200 to the target node 300.

In terms of management of the first network, restrictions preferably are put on the UE 200 for conducting the copying of a session in its own judgment only in this case, additional authentication relating to the session copying may be conducted in addition to the EAP authentication for a session handover (or within the EAP authentication for a session handover). Thereby, the session copying is enabled under the management of the first network.

The above first and second embodiments are described on the assumption that the UE 200 is a mobile phone mainly having the SIM card 250. However, the UE 200 may be any communication device such as a PC (Personal Computer), or the UE 200 may connect with a network via wireless connection or wired connection. As for the above-stated session HO information, information required for authentication of a session handover may be read out from any storage medium depending on the types of communication devices, and the access authentication method also is not limited to the above-stated EAP authentication method.

The above first and second embodiments describe the case where the UE 200 as a session handover source and the target node 300 as a session handover target connect with the same authentication server (HeNB/Home-GW 100). However, they may be implemented with different devices (i.e., the UE 200 and the target node 300 may connect with different authentication servers), and further the respective authentication servers may exist at remote positions. In this configuration, the respective authentication servers may have to exchange information (preferably in a secure state). However, contents can be offered to the target node 300 existing remotely while leaving the right of the session (or responsibility for accounting) in the UE 200. In this way, the present invention is applicable also to the case where the owner of the UE 200 and the owner of the target node 300 are different, e.g., the owner of the UE 200 donates contents to a remote education institution.

Although the above first and second embodiments describe a session of one UE 200, it is also possible to conduct a session handover for sessions of a plurality of different UEs 200 collectively. In this case, the method of the present invention may be conducted repeatedly a plurality of times (in parallel), or a UE 200 as a representative may conduct a session handover for other UEs 200 collectively for efficiency. In this case, the other UEs 200 preferably notifies the UE 200 as a representative of information required for the session handover beforehand. Further, a plurality of target nodes 300 may be included.

Restrictions may be put on the usage of a session as a target of a session handover in the target node 300. For instance, upper limits may be set for time duration of a session that the target node 300 is available or flat rate upper limits may be set for accounting, so that the session handed over can be used within this permitted range. To this end, the UE 200 and the authentication server 600 or the contents server 700 may conduct a procedure to set the upper limits beforehand, or the UE 200 may set the upper limits on its own and make a notification of the upper limits as authentication information during authentication (or when information required for authentication is prepared).

In the method of the present invention, the UE 200 and the target node 300 may synchronize their timing, so as to enable seamless switching of a session. In this case, the UE 200 puts information required for authentication together to enable collective authentication so that return of a session from the target node 300 and a new session handover to the target node 300 can be conducted simultaneously. Thereby, sessions can be exchanged with one authentication procedure. Since the UE 200 has the right of both sessions (the session that has been already transferred to the target node 300 by a session handover and the session that will be transferred to the target node 300 from now on by a session handover), this leads to an advantage of a simple authentication procedure being executed as compared with the case where both of the UE 200 and the target node 300 have the right for each session.

<Third Embodiment>

The following describes the third embodiment of the present invention. The third embodiment of the present invention describes the case where the methods in the first and second embodiments of the present invention as stated above are applied to a disaster information notification system such as the ETWS. The third embodiment of the present invention also is described referring to the network configuration illustrated in FIG. 1.

Figure 10:
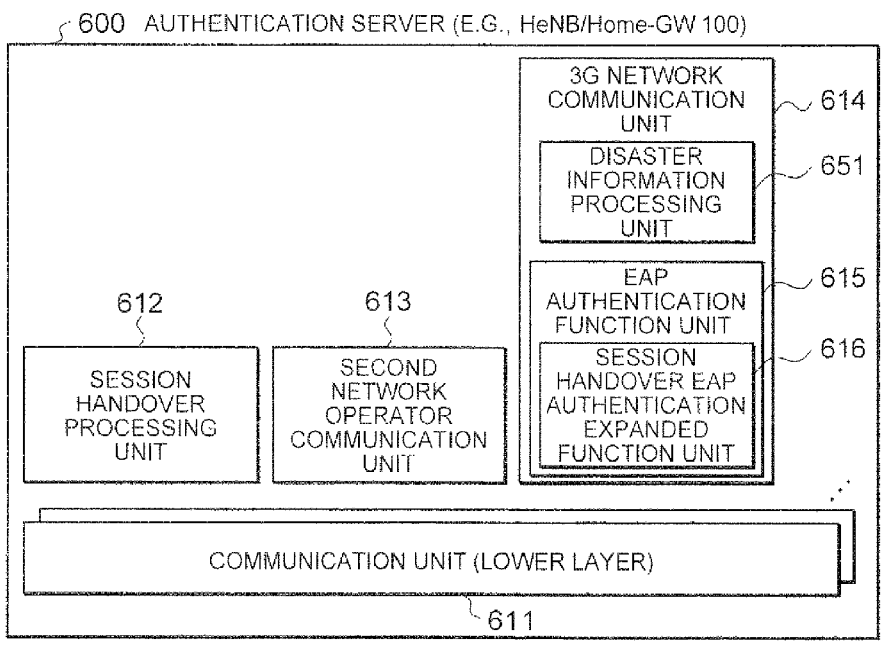
FIG. 10 illustrates an exemplary configuration of an authentication server in the third embodiment of the present invention.

FIG. 10 illustrates an exemplary configuration of an authentication server in the third embodiment of the present invention. An authentication server 600 illustrated in FIG. 10 has a configuration similar to that of the authentication server 600 illustrated in FIG. 4, where a 3G network communication unit 614 further includes a disaster information processing unit 651.

The disaster information processing unit 651 is equipped with functions to acquires a disaster information notification and process the contents of the notification. Receiving disaster information notified from a 3G network to the respective base stations, for example, the authentication server 600 makes the disaster information processing unit 651 transfer the disaster information to a device as a notification target of the disaster information. When making a notification of the disaster information to the device as a notification target, the disaster information may be added to a session provided to the device as the notification target, or the disaster information may be mixed with a session provided to the device as the notification target. The disaster information processing unit 651 may extract and process the disaster information into a format suitable to the device as a notification target such as voice, images and control signals.

Since the notification of the disaster information such as ETWS is an emergency notification, the notification is preferably made to as many communicable devices as possible that users own irrespective of individual detailed authentication. Therefore, the authentication of the present invention relating to the notification of disaster information by ETWS or the like has to operate differently from a normal notification in the notification of disaster information. Receiving the disaster information, the disaster information processing unit 651 is equipped with functions to notify an EAP authentication function unit 226 so as to conduct authentication different from normal authentication (faster authentication) or to control the processing by the EAP authentication function unit 226 for a session to notify the disaster information.

Receiving the notification of disaster information, the disaster information processing unit 651 further may start an operation to control a predetermined device and system. For instance, receiving the notification of disaster information, the disaster information processing unit 651 notifies a function (which may be equipped in the same device as the authentication server 600 or in a different device) of a home gateway capable of controlling the respective devices of the reception of disaster information. This allows the home gateway to instruct even a device incapable of acquiring/displaying disaster information itself to conduct a certain operation against the disaster, to control ON/OFF of a power source of a predetermined device and a system, for example, or to start a mode in a state of emergency (emergency mode). Examples of the control to be performed during a emergency state include: stopping an appliance using fire such as a gas stove; stopping hot-water supply and air conditioning (cooling/heating); switching from normal lighting to emergency lighting; turning on a security system; turning on a broadcasting receiver and the like. Further, when a is TV set capable of displaying disaster information is not switched on at that time, the home gateway firstly conducts processing to switch on the TV set, and then conducts a session handover according to the present invention, thus enabling notification of disaster information through the TV set.

Figure 11:
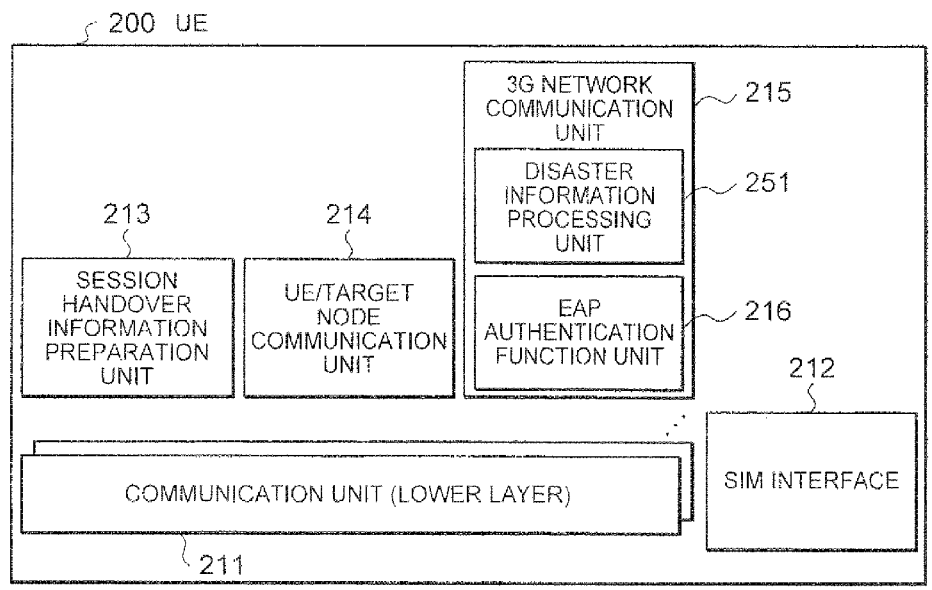
FIG. 11 illustrates an exemplary configuration of a UE in the third embodiment of the present invention.

FIG. 11 illustrates an exemplary configuration of a UE in the third embodiment of the present invention. The UE 200 illustrated in FIG. 11 has a configuration similar to that of the UE 200 illustrated in FIG. 2, where a 3G network communication unit 215 further includes a disaster information processing unit 251. Although not illustrated, in the case where the method described above in the second embodiment of the present invention is applied to ETWS, the disaster information processing unit 251 may be added to the 3G network communication unit 225 of the UE 200 illustrated in FIG. 6.

Similarly to the disaster information processing unit 651 of the authentication server 600, the disaster information processing unit 251 of the UE 200 also is equipped with a function allowing more devices to be notified rapidly of authentication relating to a notification of disaster information by ETWS or the like. That is, the disaster information processing unit 251 of the UE 200 is equipped with functions to notify an EAP authentication function unit 216 so as to conduct authentication different from normal authentication (faster authentication) or to control the processing by the EAP authentication function unit 216 for a session to notify disaster information. Further, the disaster information processing unit 251 is capable of conducting processing (e.g., processing to notify the authentication server 600 of a new target node) to provide a session relating to the disaster information to a new device as a notification target of the disaster information so that more devices can be notified of the disaster information. Further, receiving a notification of disaster information, the disaster information processing unit 251 of the UE 200 may conduct an operation (e.g., to notify a home gateway of receiving disaster information) to control a predetermined device and system.

The configuration of a target node 300 in the third embodiment of the present invention is similar to that of the target node illustrated in FIG. 3 or FIG. 7. However, the session handover EAP authentication expanded function unit 315 of the target node 300 illustrated in FIG. 3 preferably is ready to simplified additional authentication processing (described later) for fast notification of disaster information.

Figure 12:
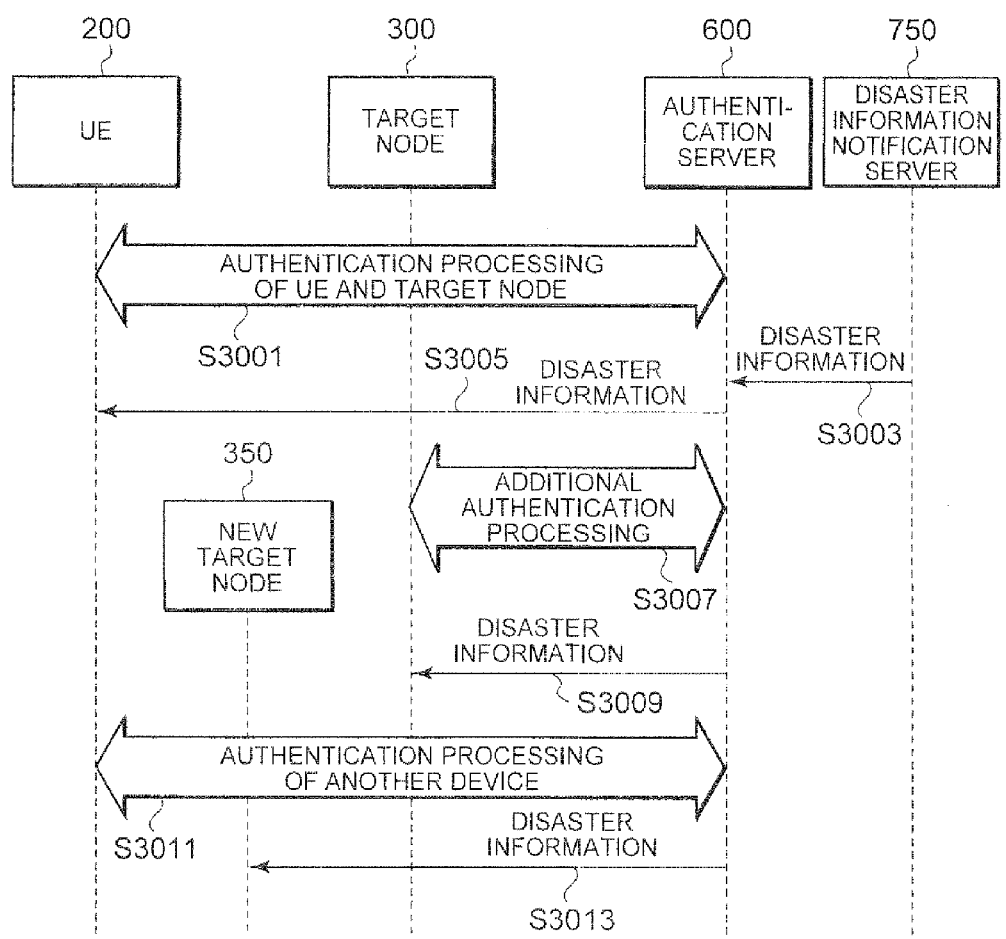
FIG. 12 is a sequence chart illustrating an exemplary operation in the third embodiment of the present invention.

The following describes an operation in the third embodiment of the present invention, based on the network system configuration of FIG. 1, and the configurations of the authentication server 600 illustrated in FIG. 10 and the UE 200 illustrated in FIG. 11. FIG. 12 is a sequence chart illustrating an exemplary operation in the third embodiment of the present invention.

In FIG. 12, assume that the UE 200 receives a session relating to a certain service from the service network 450 as an initial state, for example. That is, assume that the UE 200 conducts authentication processing with the authentication server 600 and is approved as an appropriate terminal to receive the service, and as a result the UE 200 receives a session relating to a desired service.

Assume further that the above-described method (authentication processing illustrated in FIG. 5 or FIG. 8) in the first and second embodiments of the present invention leads to a session handover of any session conducted to a specific target node 300 (Step S3001).

Assume herein that certain disaster occurs, and the authentication server 600 (an integrated device like the HeNB/Home-GW 100 or a device as a branchpoint of information transferring may be the authentication server 600) receives disaster information notifying of disaster information such as ETWS from a 3G network 400 (e.g., a disaster information notification server 750 corresponding to the contents server 700) (Step S3003).

Receiving the disaster information, the disaster information processing unit 651 of the authentication server 600 notifies the UE 200 of the disaster information (Step S3005). This notification of disaster information is conducted by a normal operation (e.g., an operation specified by ETWS).

In parallel with this, the authentication server 600 determines whether there are other devices as notification targets or not. At this time, in the case where the above-described method in the first or second embodiment of the present invention leads to a session handover conducted to the target node 300, the target node 300 has been already authorized, and the authentication server 600 understands the target node 300. In this case, the authentication server 600 conducts processing to notify the target node 300 of the disaster information by adding the disaster information to a session or by mixing the disaster information with the session.

Herein, especially in the case where notification of the disaster information is made using different sessions, the authentication server 600 has to conduct an additional authentication processing where an authentication level of at least an authentication part that the authentication server itself determines is lowered (so as to notify more devices of the disaster information) (Step S3007). Based on the information used for the session handover EAP authentication that is already authenticated, the authentication server 600 conducts the additional authentication with the target node 300. Meanwhile, the target node 300 side may be required to conduct authentication as usual relating to reception of this session/disaster information. In other words, the target node 300 may have to determine as usual whether a session transmitted is valid or not.

The additional authentication processing relating to notification of disaster information is conducted in accordance with the method described above in the first or second embodiment of the present invention, whereby authentication processing of a target node 300, which cannot be authorized originally, is conducted. Herein, notification of the additional authentication processing has to be made rapidly and to more devices, and therefore simplified authentication processing is desirable. For instance, simplified authentication information preferably is used or a simplified authentication procedure preferably is conducted in the additional authentication processing so as to implement fast authentication processing with a lowered authentication level. Further, the authentication server 600 may be configured to simply convey that a session can be started without necessity of a complicated authentication procedure and to covey disaster information forcefully without an authentication processing.

In this way, when the authentication server 600 succeeds in the additional authentication processing with the target node 300 that is already authenticated by a session handover, the authentication server 600 notifies the target node 300 of disaster information by adding a session to notify the disaster information or by mixing the disaster information with an existing session (Step S3009).

The authentication server 600 further conducts authentication processing to another device (a device without SIM information available for authentication at the 3G network 400, hereinafter described as a new target node 350) to which authentication by a session handover is not conducted so as to make a notification of the disaster information (Step S3011). At this time, the UE 200 receiving the disaster information transmits session HO information relating to the disaster information to a new target node 350, whereby a session handover (the method described above in the first embodiment of the present invention) may be started, or the UE 200 transmits ID information on the new target node 350 to the authentication server 600 (or the authentication server 600 urges authentication processing relating to another device that the authentication server 600 understands the existence thereof by any method), whereby a session handover (the method described above in the second embodiment of the present invention) may be started. Herein, the session HO information and the authentication procedure in this case also are simplified, so that fast authentication with a lowered authentication level is preferably conducted. The authentication server 600 further may notify the new target node 350, the existence of which is specified, that a session can be started without necessity of a complicated authentication procedure or may notify the same of disaster information forcefully without authentication processing. Then, when the authentication server 600 succeeds in the authentication processing of the new target node 350, the authentication server 600 conducts processing to notify the device of the disaster information (Step S3013).

Herein, the authentication server 600 preferably conducts processing to notify the UE 200, the target node 300 that has been already authenticated by a session handover, and the new target node 350 that is not authenticated by a session handover of the disaster information independently and in parallel. Although the authentication server 600 is required to covey initial information (primary information) of the disaster information within a predetermined time period (within 4 seconds), the additional authentication processing might delay the first notification (especially to the new target node 350). In order to avoid such delay, the authentication server 600 may make a notification of the initial information (primary information) of the disaster information in parallel with the authentication processing, and after succeeding in the authentication processing, may make a notification of detailed information (secondary information).

Although not illustrated in FIG. 12, receiving a notification of disaster information, the authentication server 600 may start an operation to control a predetermined device and system. For instance, receiving a notification of disaster information, the authentication server 600 may notify a function (which may be equipped in the same device as the authentication server 600 or in a different device) of a home gateway capable of controlling the respective devices of the reception of disaster information, so as to enable the home gateway to immediately start controlling the predetermined device and system.

Herein, processing to be conducted when receiving disaster information is preferably registered in the UE 200, the target node 300/the new target node 350, and the authentication server 600, and the processing relating to a notification of disaster information is preferably conducted with a higher priority (or the highest priority) than other processing.

<Fourth Embodiment>

The following describes the fourth embodiment of the present invention. The above third embodiment of the present invention describes the case where the authentication server 600 receives a notification of disaster information from the 3G network 400 and notifies the UE 200 of the disaster information. However, there may be a case where the UE 200 also is connectable with the 3G network 400 via a macro base station and the UE 200 receives disaster information from the 3G network 400 prior to the authentication server 600. The fourth embodiment of the present invention describes the case where the UE 200 receives a notification of disaster information from the 3G network 400.

For instance, there is a case where the UE 200 participates in a disaster information notification service and is capable of directly receiving disaster information from a disaster information notification system (e.g., ETWS). In such a case, the UE 200 may receive disaster information firstly from a macro-base station not from the authentication server 600 (an integrated device like the HeNB/Home-GW 100 or a device as a branchpoint of information transferring may be the authentication server 600). Herein., in order to allow the UE 200 to receive disaster information from a macro base station in this way, the UE 200 has to connect with the macro base station. To this end, during an idle state, the UE 200 may connect with the macro base station for easier reception of disaster information from the ETWS, for example, or after a user returns home and completes to transfer his/her own session to a target node 300 such as a TV set, the UE 200 may turn an idle state and connect with the macro base station.

In addition to the configuration according to the above third embodiment of the present invention, the UE 200 in the fourth embodiment of the present invention is further equipped with a function to, receiving disaster information from the 3G network 400 side, make a disaster information processing unit 251 transfer the disaster information to the authentication server 600. In addition to the configuration according to the above third embodiment of the present invention, the authentication server 600 in the fourth embodiment of the present invention is further equipped with a function to receive a notification of disaster information not only from the 3G network 400 side but also from the UE 200.

Figure 13:
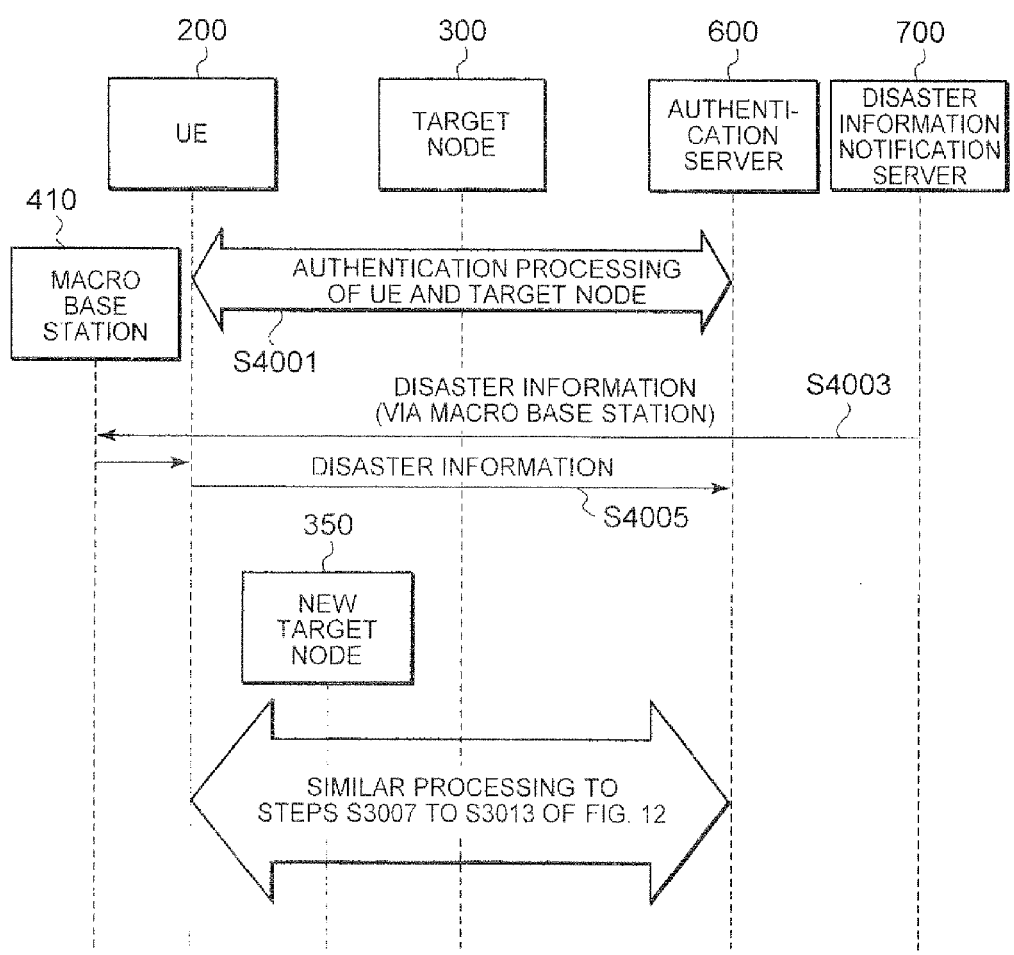
FIG. 13 is a sequence chart illustrating an exemplary operation in the fourth embodiment of the present invention.

The following describes an operation in the fourth embodiment of the present invention. FIG. 13 is a sequence chart illustrating an exemplary operation in the fourth embodiment of the present invention.

In FIG. 13, assume that the UE 200 receives a session relating to a certain service from the service network 450 as an initial state, for example. That is, assume that the UE 200 conducts an authentication processing with the authentication server 600 and is approved as an appropriate terminal to receive the service, and as a result the UE 200 receives a session relating to a desired service.

Assume further that the above-described method (authentication processing illustrated in FIG. 5 or FIG. 8) in the first or second embodiment of the present invention leads to a session handover of any session conducted to a specific target node 300 (Step S4001).

Assume herein that certain disaster occurs, and the UE 200 receives disaster information notifying disaster information such as ETWS from a 3G network 400 (e.g., a disaster information notification server 750 corresponding to the contents server 700) via a macro base station 410 (Step S4003). At this time, the disaster information processing unit 251 of the UE 200 transfers the disaster information to the authentication server 600 (Step S4005).

The following processing is substantially similar to the above-stated operation (Steps S3007 to S3013 of FIG. 12) in the third embodiment of the present invention. That is, the authentication server 600 receives the disaster information transferred from the UE 200, and conducts authentication to transfer the disaster information to the target node 300 and a new target node 350 and a notification of the disaster information. Herein, since the authentication server 600 receives the disaster information from the UE 200, there is no need to notify the UE 200 of the disaster information again. Preferably, at the time of receiving the disaster information from the 3G network 400, the UE 200 transfers the disaster information to the authentication server 600, while voluntarily starting processing (preparation for additional authentication processing between the target node 300 or the new target node 350 and the authentication server 600) to enable transferring of the disaster information to the target node 300 and the new target node 350. Further, at the time of receiving the disaster information from the 3G network 400, the UE 200 itself may directly transfer the disaster information to the target node 300, the new target node 350, and a home gateway capable of controlling devices and systems, or the UE 200 itself may serve as a home gateway to control devices and systems.

<Fifth Embodiment>

The above-stated embodiments of the present invention describe the case where the HeNB/Home-GW 100 is fixedly installed. However, the present invention is applicable also to the case where an in-mobile unit network gateway corresponding to the HeNB/Home-GW 100 is mounted in a mobile unit (such as a vehicle or a train). In this case, the in-mobile unit network gateway may directly connect with the 3G network 400, or the UE 200 connectable with the 3G network 400 may exist in the mobile unit and the in-mobile unit network gateway may connect with the 3G network 400 via the UE 200 (the UE 200 serving as a gateway).

In such a configuration, it is possible to hand over a session that a device including SIM information (the UE 200, a navigation system without SIM information, or the like) can receive to a device without SIM information (a monitor installed in the mobile unit, a navigation system without SIM information, or the like), for example.

In this case, connection between the in-mobile unit network gateway and the 3G network 400 also is wireless connection. For instance, there may be a case where this wireless connection is broken in some cases. In such a case, however, a session can be automatically and effectively returned to the UE 200 (a session handover).

Further, the contents of the in-mobile unit network may be provided to the UE 200 via the 3G network 400. In this case, the target node 300 without SIM information (e.g. a camera installed in the mobile unit) is subjected to authentication according to the method of the present invention based on the SIM information of the in-mobile unit network gateway, and thereafter the contents (e.g., an image shot by the camera) can be transferred to a network performing a connection service of the in-mobile unit network gateway via the in-mobile unit network gateway, so that the UE 200 can receive these contents as a service provided from the 3G network 400. For instance, when the UE 200 receives these contents service via the in-mobile unit network gateway in the mobile unit, the UE 200 acquires session HO information from the in-mobile unit network gateway and conducts authentication relating to a session handover with an authentication server of a network performing a connection service of the in-mobile unit network gateway, whereby the UE 200 can receive the contents via the 3G network 400. Thereby, the UE 200 can receive contents transmitted by the target node from the macro base station via the 3G network 400, and even when the user of the UE 200 leaves the mobile unit, for example, the user can receive and view an image shot by a camera in the mobile unit. Not only in the mobility unit, it is further possible to receive and view video of a door phone installed in a building by the UE 200 in a similar manner, for example.

<Sixth Embodiment>

The method according to the present invention is further applicable to an upload type session where data is transmitted from the UE 200 or the target node 300 to the network side as stated above. For instance, a session of uploading an image shot by a camera of the UE 200 may be handed over to a video camera connecting with a home network, and thereafter uploading can be conducted by switching from an image shot by the UE to an image shot by the video camera. In the case of the above-stated mobile unit as well, a session handover may be conducted from the camera of the UE 200 to the camera installed in the mobile unit, whereby a session handover switching a shooting object from the camera of the UE 200 to the camera installed in the mobile unit can be conducted. Herein, an operation for a session handover relating to data upload is basically the same as the operation for a session handover relating to data download, where their transferring direction of the contents between the contents server and the UE 200 (or the target node 300) simply is reversed.

Figure 9:
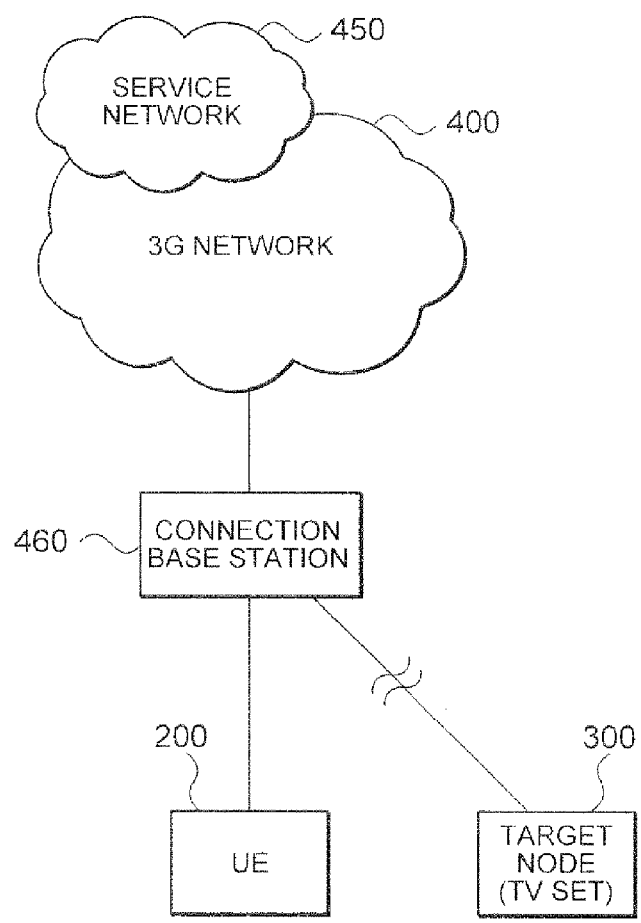
FIG. 9 illustrates an exemplary network system configuration in the conventional technique to explain problems to be solved by the present invention.

Although not illustrated in FIG. 1 and FIG. 9, a GW (hereinafter HeNB-GW) may exist on the 3G network side (between HeNB and 3G network) to let the HeNB connect with the 3G network. At this time, the HeNB-GW conceivably functions as a gateway device to the 3G network with respect to a plurality of HeNBs, and shares some functions with the HeNB. The above-stated embodiments of the present invention can be implemented irrespective of how the functions of the present invention and the functions according to the present invention are shared between the HeNB and the HeNB-GW.

Note that each functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available by the development of a semiconductor technique or derived techniques, functional blocks may be naturally integrated using such a technique. For instance, biotechnology may be applied thereto.

Industrial Applicability

The present invention has an advantage of enabling a session handover between devices with different key generation functions in an authentication protocol, and is applicable to a communication technique in a packet switched data communication network. The present invention is particularly applicable to a technique relating to an authentication technique for network connection and session mobility.

The invention claimed is:

1. A communication system, comprising a first network, a first node belonging to the first network, and a second node belonging to a second network different from the first network, wherein authentication is conducted to perform a session handover from a first session to a second session using authentication information with the first network kept by the first node, the first session being established between the first network and the first node, and the second session being established between the first network and the second node, the first node being an end node of the first session and the second node being an end node of the second session, the authentication information including SIM information and being previously assigned to the first node and unique to the first node, the first node being structured to notify the second node of the authentication information, and the second node being structured to notify an authentication server of the first network of information generated based on the authentication information when the second node conducts authentication processing for the session handover with the authentication server.

2. A communication processing device included in a first node belonging to a first network in a communication system, the communication processing device comprising:

an authenticator structured to perform an authentication operation to enable a session handover from a first session to a second session using authentication information with the first network kept by the first node, the first session being established between the first node and the first network, the second session being established between the first network and a second node belonging to a second network different from the first network, the first node being an end node of the first session and the second node being an end node of the second session;

a storage structured to store the authentication information, the authentication information including SIM information and being previously assigned to the first node and unique to the first node, and a communicator structured to read the authentication information from the storage unit, and to notify the second node of the authentication information so as to enable the second node to notify an authentication server of the first network of information generated based on the authentication information when the second node conducts authentication processing for the session handover with the authentication server.

3. The communication processing device according to claim 2, wherein the authentication information comprises: information requesting session copy to start the second session between the second node and the first network while leaving the first session being communicated by the first node; or information requesting session switching to switch the session from the first session to the second session.

4. The communication processing device according to claim 2, further configured to conduct processing to return a session from the second node to the first node when the first node detects disconnection of the session which has been handed over from the first node to the second node.

5. The communication processing device according to claim 2, further configured to conduct authentication with the authentication server of the first network to return a session from the second node to the first node when the first node returns the session which has been handed over from the first node to the second node.

6. The communication processing device according to claim 2, further comprising a transmitter structured to transmit, to the first network, signaling to hand over the session when the authentication processing succeeds.

7. The communication processing device according to claim 2, further comprising a transmitter structured to transmit, to the second node, an instruction to start the session handover after the authentication processing succeeds.

8. The communication processing device according to claim 2, further comprising a generator structured to generate information necessary to collectively conduct processing to hand over a session from the first node to the second node and processing to return a session, which has been already handed over from the first node to the second node, from the second node to the first node.

9. The communication processing device according to claim 2, further comprising a notifier structured to notify information to conduct faster and simple authentication as the information necessary to authentication for the session handover, for a session handover relating to disaster information for notification of disaster occurrence.

10. The communication processing device according to claim 2, further comprising a transferer structured to transfer disaster information to the authentication server when the first node receives disaster information for notification of disaster occurrence not via the authentication server.

11. A communication processing device included in a second node belonging to a second network in a communication system, the communication processing device comprising:

a receiver structured to receive authentication information from a first node belonging to a first network different from the second network, the authentication information including SIM information and being previously assigned to the first node and unique to the first node, and authentication being conducted to perform a session handover from a first session to a second session using the authentication information with the first network kept by the first node, the first session being established between the first node and the first network, and the second session being established between the first network and the second node, the first node being an end node of the first session and the second node being an end node of the second session, a communicator structured to notify an authentication server of the first network of information generated based on the authentication information when the second node conducts authentication processing for the session handover with the authentication server.

12. The communication processing device according to claim 11, further comprising a transmitter structured to transmit, to the first network, signaling to hand over the session when the authentication processing succeeds.

13. The communication processing device according to claim 11, further comprising a transmitter structured to transmit, to the first network, signaling to hand over the session, when the second node receives, from the first node, an instruction to start the session handover after the authentication processing succeeds.

14. The communication processing device according to claim 11, further comprising a notifier structured to notify information to conduct faster and simple authentication as the information generated based on the information necessary to authentication for the session handover, for a session handover relating to disaster information for notification of disaster occurrence.

15. An authentication processing device included in an authentication server belonging to a first network in a communication system, the authentication processing device comprising:

an authenticator structured to perform an authentication operation to enable a session handover from a first session to a second session using authentication information with the first network kept by a first node belonging to the first network, the first session being established between the first node and the first network, and the second session being established between the first network and a second node belonging to a second network different from the first network, the first node being an end node of the first session and the second node being an end node of the second session, a receiver structured to receive generated information from the second node when the authentication server conducts authentication processing for the session handover with the second node, the generated information being generated by the second node based on the authentication information that the second node receives from the first node, the authentication information including SIM information and being previously assigned to the first node and unique to the first node, and a communicator structured to conduct authentication for the session handover using the generated information, wherein the communicator is further structured to specify the first node based on the generated information, and to authenticate whether or not to hand over the session from the first session to the second session.

16. The authentication processing device according to claim 15, further comprising a switch structured to switch a data transfer destination for the session from the first node to the second node when the authentication processing succeeds.

17. The authentication processing device according to claim 15, further comprising a transmitter structured to transmit signaling to a device transferring data relating to the session so that a transfer destination for the data is switched from the first node to the second node, when the authentication processing succeeds.

18. The authentication processing device according to claim 15, further comprising a processor structured to conduct processing to return a session from the second node to the first node when disconnection of the session which has been handed over from the first node to the second node is detected.

19. The authentication processing device according to claim 15, further comprising a processor structured to conduct authentication for a session in a simple manner for faster authentication when the session is to transmit disaster information for notification of disaster occurrence.

\* \* \* \* \*